US010055809B2

(12) United States Patent
Holland et al.

(10) Patent No.: US 10,055,809 B2
(45) Date of Patent: Aug. 21, 2018

(54) SYSTEMS AND METHODS FOR TIME SHIFTING TASKS

(71) Applicant: Apple Inc., Cupertino, CA (US)

(72) Inventors: Peter F. Holland, Los Gatos, CA (US); Benjamin K. Dodge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 15/150,172

(22) Filed: May 9, 2016

(65) Prior Publication Data
US 2017/0323419 A1    Nov. 9, 2017

(51) Int. Cl.
G09G 5/36 (2006.01)
G06T 1/60 (2006.01)
G06T 1/20 (2006.01)
G09G 5/00 (2006.01)
G11B 20/10 (2006.01)

(52) U.S. Cl.
CPC .................. *G06T 1/60* (2013.01); *G06T 1/20* (2013.01); *G09G 5/006* (2013.01); *G11B 20/10481* (2013.01); *G09G 2360/18* (2013.01)

(58) Field of Classification Search
CPC ...... G09G 5/001; G09G 2360/12; G06T 1/60; G06F 13/1605; G06F 13/1673; G06F 13/14; G06F 13/1626; G06F 13/1642
See application file for complete search history.

(56) References Cited

U.S. PATENT DOCUMENTS

| 6,272,566 | B1 | 8/2001 | Craft |
| 8,549,199 | B2 | 10/2013 | Mace |
| 8,959,266 | B1 | 2/2015 | Bonen et al. |
| 9,141,561 | B2 | 9/2015 | Lasserre et al. |
| 2006/0026450 | A1* | 2/2006 | Bounitch ............... G06F 1/3203 713/600 |
| 2012/0072679 | A1* | 3/2012 | Biswas ............... G06F 13/1626 711/154 |
| 2014/0240332 | A1* | 8/2014 | Holland .................... G06T 1/60 345/531 |
| 2014/0333643 | A1* | 11/2014 | Kuo .......................... G06T 1/60 345/545 |

* cited by examiner

Primary Examiner — Hau H Nguyen
(74) Attorney, Agent, or Firm — Rory D. Rankin; Meyertons, Hood, Kivlin, Kowert & Goetzel, P.C.

(57) ABSTRACT

Systems, apparatuses, and methods for time shifting tasks in a computing system. A system may include a display control unit configured to process pixels for display. The display control unit may include at least one or more pixel processing pipelines, a control unit, and a pixel buffer. The control unit may be configured to monitor the amount of data in the pixel buffer and set the priority of pixel fetch requests according to the amount of data in the pixel buffer. If the control unit determines that an inter frame period will occur within a given period of time, the control unit may prevent the priority of pixel fetch requests from being escalated if the amount of data in the pixel buffer falls below a threshold. The control unit may also be configured to fill the buffers of the display control unit with as much data as possible during the inter frame period.

17 Claims, 10 Drawing Sheets

SYSTEMS AND METHODS FOR TIME SHIFTING TASKS

BACKGROUND

Technical Field

Embodiments described herein relate to the field of computer systems and more particularly, to optimizing the fetching of data for graphical information processing.

Description of the Related Art

Part of the operation of many computer systems, including portable digital devices such as mobile phones, notebook computers and the like, is to employ a display device, such as a liquid crystal display (LCD), to display images, video information/streams, and data. Accordingly, these systems typically incorporate functionality for generating images and data, including video information, which are subsequently output to the display device. Such devices typically include video graphics circuitry (e.g., a display control unit) to process images and video information for subsequent display.

In digital imaging, the smallest item of information in an image is called a "picture element," more generally referred to as a "pixel." For convenience, pixels are generally arranged in a regular two-dimensional grid. By using such an arrangement, many common operations can be implemented by uniformly applying the same operation to each pixel independently. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of ordered image frames, or frames for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store the pixels for image and video frame information. The information in a frame buffer typically consists of color values for every pixel to be displayed on the screen. Color values are commonly stored in 1-bit monochrome, 4-bit palletized, 8-bit palletized, 16-bit high color and 24-bit true color formats. The total amount of the memory required for frame buffers to store image/video information depends on the resolution of the output signal, and on the color depth and palette size. The High-Definition Television (HDTV) format, for example, is composed of up to 1080 rows of 1920 pixels per row, or almost 2.1M pixels per frame. A display control unit is often tasked with fetching new source pixel data for various processing tasks throughout video playback. However, such fetches may occur at busy or other inopportune times.

SUMMARY

Systems, apparatuses, and methods for time shifting tasks in a computing system are contemplated.

In one embodiment, an apparatus may include at least one display control unit for processing source image data and driving output frame pixels to one or more displays. The display control unit may fetch source image data from memory and store the fetched source image data in one or more line buffers. The display control unit may also fetch parameter data and store the parameter data in one or more parameter first in, first out buffers (FIFOs). The display control unit may process the source image data and store output pixel data in a pixel buffer to be conveyed to a display backend.

In one embodiment, the display control unit may include at least one or more pixel processing pipelines, a control unit, and a pixel buffer. The display control unit may be configured to set a priority of pixel fetch requests sent to memory based on an occupancy level of the pixel buffer. If the control unit determines an inter frame period or other period of relative inactivity is about to begin, the control unit may prevent the priority of pixel fetch requests from being escalated if the amount of pixel data in the pixel buffer is less than a given threshold. In one embodiment, the inter frame period may be a mid-frame blanking interval.

In one embodiment, the host system or apparatus may be configured to increase the frequency of touch sensing on the display by performing mid-frame blanking. To perform mid-frame blanking, the display control unit may interrupt the vertical active period of frames being driven to the display and introduce a mid-frame blanking interval after a first portion of the frame has been displayed. Then, after this mid-frame blanking interval has expired, the next portion of the frame may be driven to the display, after which another mid-frame blanking interval may be introduced. Any number of mid-frame blanking intervals may be introduced within a given frame, with the higher the number of mid-frame blanking intervals, the higher the frequency of touch sensing that can be performed.

Then, during a mid-frame blanking interval, the display control unit may prevent the priority of pixel fetch requests from being escalated. Also during the mid-frame blanking interval, the control unit may attempt to fetch pixels and fill all available queues and buffers to capacity so that the display control unit comes out of the mid-frame blanking interval with a maximum amount of pixel data available for processing and driving to the display. Accordingly, the control unit may turn off request aggregation during the mid-frame blanking interval. The control unit may also attempt to fetch as much frame configuration data as possible during the mid-frame blanking interval.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
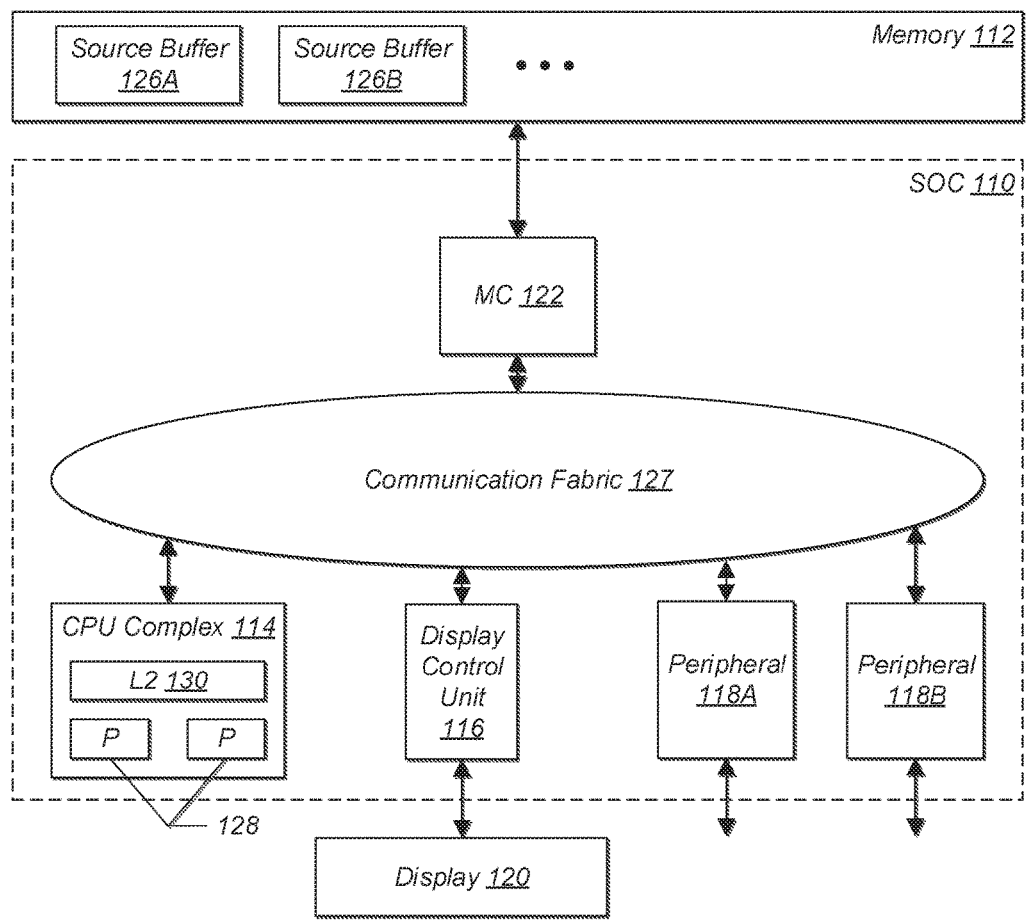
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip". In some embodiments, the components may be implemented on two or more discrete chips in a system. However, the SOC 110 will be used as an example herein. In the illustrated embodiment, the components of the SOC 110 include a central processing unit (CPU) complex 114, display control unit 116, peripheral components 118A-118B (more briefly, "peripherals"), a memory controller (MC) 122, and a communication fabric 127. The components 114, 116, 118A-118B, and 122 may all be coupled to the communication fabric 127. The memory controller 122 may be coupled to the memory 112 during use. Similarly, the display control unit 116 may be coupled to the display 120 during use. In the illustrated embodiment, the CPU complex 114 includes one or more processors 128 and a level two (L2) cache 130.

The display control unit 116 may include hardware to process one or more still images and/or one or more video sequences for display on the display 120. Generally, for each source still image or video sequence, the display control unit 116 may be configured to generate read memory operations to read the data representing respective portions of the frame/video sequence from the memory 112 through the memory controller 122.

The display control unit 116 may be configured to perform any type of processing on the image data (still images, video sequences, etc.). In one embodiment, the display control unit 116 may be configured to scale still images and to dither, scale, and/or perform color space conversion on their respective portions of frames of a video sequence. The display control unit 116 may be configured to blend the still image frames and the video sequence frames to produce output frames for display. Display control unit 116 may also be more generally referred to as a display pipe, display pipeline, or a display controller. A display control unit may generally be any hardware configured to prepare a frame for display from one or more sources, such as still images and/or video sequences.

More particularly, display control unit 116 may be configured to retrieve respective portions of source frames from one or more source buffers 126A-126B stored in the memory 112, composite frames from the source buffers, and display the resulting frames on corresponding portions of the display 120. Source buffers 126A and 126B are representative of any number of source frame buffers which may be stored in memory 112. Accordingly, display control unit 116 may be configured to read the multiple source buffers 126A-126B and composite the image data to generate the output frame.

The display 120 may be any sort of visual display device. The display 120 may be a liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device. Various types of source image data may be shown on display 120. In various embodiments, the source image data may represent a video clip in a format, such as, for example, Moving Pictures Expert Group-4 Part 14 (MP4), Advanced Video Coding (H.264/AVC), or Audio Video Interleave (AVI). Alternatively, the source image data may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG).

In some embodiments, the display 120 may be directly connected to the SOC 110 and may be controlled by the display control unit 116. That is, the display control unit 116 may include hardware (a "backend") that may provide various control/data signals to the display 120, including timing signals such as one or more clocks and/or the vertical blanking period and horizontal blanking interval controls. The clocks may include the pixel clock indicating that a pixel is being transmitted. The data signals may include color signals such as red, green, and blue, for example. The display control unit 116 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasman interface, a cathode ray tube (CRT) interface, any proprietary display interface, etc.

The display control unit 116 may be configured to issue pixel fetch requests to memory to fetch source pixel data from memory. In normal operation, the fetching of source pixel data may occur in bursts while the display backend may consume output pixel data at a fixed rate. However, during a mid-frame blanking interval, the display backend may not be draining any pixels from the display control unit 116. During the mid-frame blanking interval, and during the period of time leading up to the mid-frame blanking interval, the display control unit 116 may de-prioritize the fetching of source pixel data. By de-prioritizing the fetching of source pixel data during these periods of time, the display control unit 116 will reduce contention on the memory subsystem and allow other processes to retrieve data from memory 112 without being negatively impacted by source pixel fetch requests. During a mid-frame blanking interval, the display control unit 116 may also be configured to disable request aggregation. The display control unit 116 may also fetch as much configuration data for upcoming frames as is available in memory 112 during a mid-frame blanking interval.

For some types of displays, the touch sensor is integrated with or closely coupled to the display common voltage layer, and actively driving pixels can interfere with the ability to perform touch sensing on the display. Accordingly, touch sensing is typically performed in the vertical blanking period between frames. However, this limits the frequency of touch sensing to the frame refresh rate. In some cases, SOC 110 may be configured to increase the frequency of touch sensing by inserting mid-frame blanking intervals into the vertical active period of frames being driven to the display 120. To perform mid-frame blanking, the display control unit 116 may interrupt the vertical active period ("active period") of frames being driven to the display 120 and introduce a mid-frame blanking interval after a first portion of the frame has been displayed. Then, after this mid-frame blanking interval has expired, the next portion of the frame may be driven to the display, after which another mid-frame blanking interval may be introduced. Any number of mid-frame blanking intervals may be introduced within a given frame, with the higher the number of mid-frame blanking intervals, the higher the frequency of touch sensing that can be performed.

In addition to performing mid-frame blanking, display control unit 116 may be configured to perform request aggregation. In response to detecting one or more conditions, the display control unit 116 may aggregate a number of memory requests prior to attempting to send any memory requests from the display control unit 116 to memory 112 via communication fabric 127 and memory controller 122. An idle pause in user activity may be one condition for aggregating requests. The number of memory requests to aggregate may be a programmable value. For example, in one embodiment, the display control unit 116 may aggregate a relatively large amount of storage space for source pixel data prior to generating memory read requests before becoming a candidate for arbitration. As a result, the memory 112 may not be accessed for a relatively large amount of time if no other functional blocks are accessing the memory 112. Therefore, the memory 112 may spend longer amounts of time in a low-power mode causing an overall reduction in power consumption. However, during a mid-frame blanking interval, the display control unit 116 may be configured to disable request aggregation to ensure as much source pixel data is fetched as possible during this interval.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or an interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals 118A-118B may include audio peripherals such as microphones, speakers, interfaces to microphones and speakers, audio processors, digital signal processors, mixers, etc. The peripherals 118A-118B may include interface controllers for various interfaces external to the SOC 110 including interfaces such as Universal Serial Bus (USB), peripheral component interconnect (PCI) including PCI Express (PCIe), serial and parallel ports, etc. The peripherals 118A-118B may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
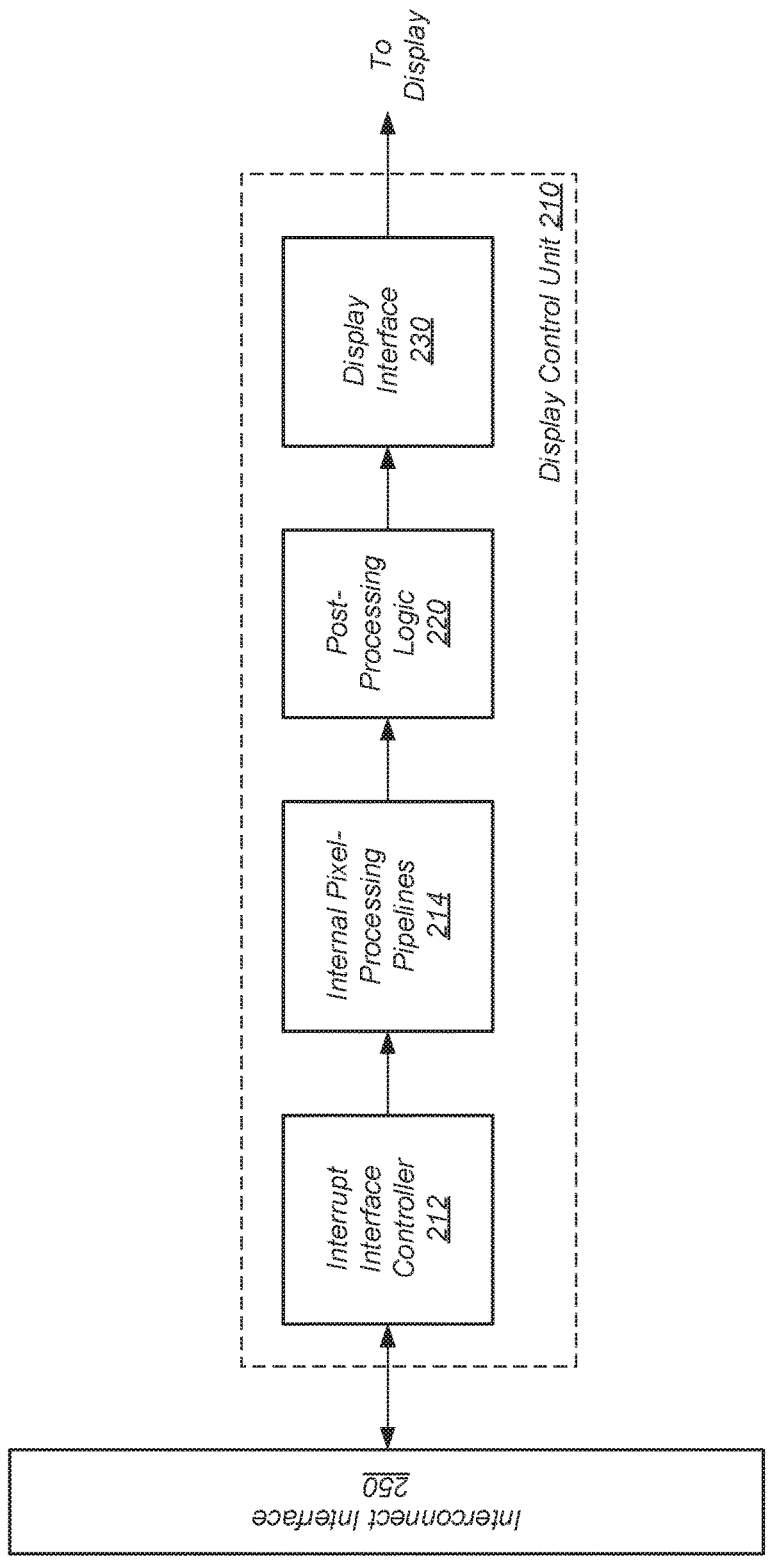
FIG. 2 is a block diagram of one embodiment of a display control unit for use in a SOC.

Turning now to FIG. 2, a generalized block diagram of one embodiment of a display control unit for use in a SoC is shown. Although one display control unit is shown, in other embodiments, the host SOC (e.g., SOC 110) may include multiple display control units. Generally speaking, display control unit 210 may be configured to process a source image and send rendered graphical information to a display (not shown).

Display control unit 210 may be coupled to interconnect interface 250 which may include multiplexers and control logic for routing signals and packets between the display control unit 210 and a top-level fabric. The interconnect interface 250 may correspond to communication fabric 127 of FIG. 1. Display control unit 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display control unit 210 may include one or more internal pixel-processing pipelines 214. The internal pixel-processing pipelines 214 may include one or more ARGB (Alpha, Red, Green, Blue) pipelines for processing and displaying user interface (UI) layers. The internal pixel-processing pipelines 214 may also include one or more pipelines for processing and displaying video content such as YUV content. In some embodiments, internal pixel-processing pipelines 214 may include blending circuitry for blending graphical information before sending the information as output to post-processing logic 220.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

The display control unit 210 may include post-processing logic 220. The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
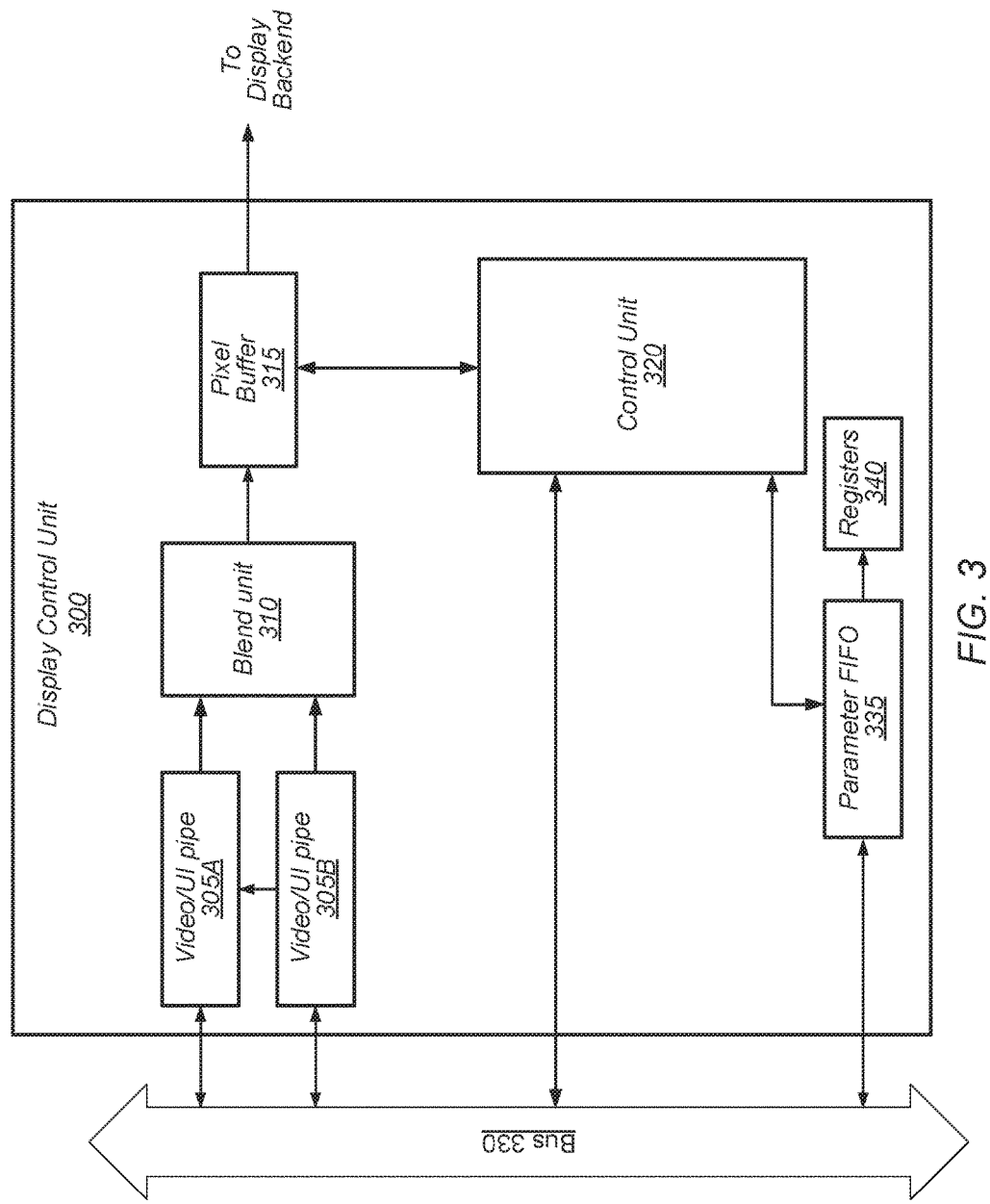
FIG. 3 is a block diagram illustrating one embodiment of a display control unit.

Referring now to FIG. 3, one embodiment of a display control unit 300 is shown. Display control unit 300 may represent display control unit 116 included in SoC 110 of FIG. 1. Display control unit 300 may be coupled to bus 330 and to a display backend (not shown). In some embodiments, a display backend may directly interface to the display to display pixels generated by display control unit 300. Display control unit 300 may include functional sub-blocks such as one or more video/user interface (UI) pipelines 305A-305B, blend unit 310, pixel buffer 315, control unit 320, parameter FIFO 335, and registers 340. Display control unit 300 may also include other components which are not shown in FIG. 3 to avoid cluttering the figure.

Bus 330 may couple various functional blocks such that the functional blocks may pass data between one another. Bus 330 may correspond to communication fabric 127 of FIG. 1. Display control unit 300 may be coupled to bus 330 in order to receive video frame data for processing. The display control unit 300 may include one or more video/UI pipelines 305A-B, each of which may be a video and/or UI pipeline depending on the embodiment. It is noted that the terms "video/UI pipeline", "pixel processing pipeline", and "pixel generation logic" may be used interchangeably herein. In other embodiments, display control unit 300 may have one or more dedicated video pipelines and/or one or more dedicated UI pipelines. Each video/UI pipeline 305 may fetch a video or image frame (or a portion of a frame) from a buffer coupled to bus 330. The buffered video or image frame may reside in a system memory such as, for example, system memory 112 from FIG. 1. Each video/UI pipeline 305 may fetch a distinct image and may process the image in various ways, including, but not limited to, format conversion (e.g., YCbCr to ARGB), image scaling, and dithering. In some embodiments, each video/UI pipeline 305 may process one pixel at a time, in a specific order from the video frame, outputting a stream of pixel data, and maintaining the same order as pixel data passes through.

Blend unit 310 may receive a pixel stream from one or more video/UI pipelines 305. If only one pixel stream is received, blend unit 310 may simply pass the stream through to the next sub-block. However, if more than one pixel stream is received, blend unit 310 may blend the pixel colors together to create an image to be displayed. In various embodiments, blend unit 310 may be used to transition from one image to another or to display a notification window on top of an active application window. For example, a top layer video frame for a notification, such as, for a calendar reminder, may need to appear on top of an internet browser window. The calendar reminder may comprise some transparent or semi-transparent elements in which the browser window may be at least partially visible, which may require blend unit 310 to adjust the appearance of the browser window based on the color and transparency of the calendar reminder.

The output of blend unit 310 may be a single pixel stream composite of the one or more input pixel streams. The pixel stream output of blend unit 310 may be sent to pixel buffer 315. In other embodiments, the pixel stream may be sent to other target destinations. For example, the pixel stream may be sent to a network interface. It is noted that while a pixel buffer 315 is described herein, other structures configured to store data are possible and are contemplated.

Pixel buffer 315 may be configured to store pixels output from blend unit 310. In various embodiments, buffer 315 may operate as a queue or first-in-first-out (FIFO) structure in which data stored in the buffer is read out in the same order it was written. Such a buffer may comprise RAM or registers and may utilize pointers to the first and last entries in the FIFO. During "normal" operation, pixel buffer 315 may be the interface to the display backend (not shown), which may control the display in order to display the pixels generated by display control unit 300. In one embodiment, the display backend may read pixels at a rate from pixel buffer 315 according to a pixel clock. The rate may depend on the resolution of the display as well as the refresh rate of the display. For example, a display having a resolution of N multiplied by M (N×M) and a refresh rate of R frames per second may have a pixel clock frequency based on N×M×R, where N, M and R are integers. On the other hand, pixel buffer 315 may be written by blend unit 310 as pixels are generated by blend unit 310. In some instances, the rate at which display control unit 300 generates pixels may be faster than the rate at which the pixels are read, assuming that data is provided to display control unit 300 from the memory (not shown) quickly enough. The pixels in pixel buffer 315 may thus be a measure of a margin of safety for display control unit 300 before erroneous operation is observed on the display.

In other cases, the pixel buffer 315 may not be able to provide data fast enough for proper display and an underrun condition may occur. Generally speaking, given a current processing rate of data stored in the pixel buffer 315, and knowledge of a typical data access latency, it can be determined whether the amount of data stored in the pixel buffer 315 will be adequate to prevent an underrun condition—assuming continued processing of pixel data at a given rate and continued requests for data with a given access latency. For example, a minimum amount of data can be determined to be needed to continue to satisfy processing demands. If the amount of data were to fall any lower, then it may not be possible to meet the current processing demands.

Control unit 320 may receive various control signals and include control logic for managing the overall operation of display control unit 300. For example, control unit 320 may receive a signal to indicate a new video frame is ready for processing. In some embodiments, this signal may be generated outside of display control unit 300 and in other embodiments display control unit 300 may generate the signal. In some embodiments, display control unit 300 may include a parameter buffer (e.g., parameter FIFO 335). The parameter FIFO 335 may store values to be written to the configuration registers 340 for subsequent frames. The same configuration of registers may be used for multiple frame generations, in some embodiments, and thus the parameter FIFO 335 may include data that indicates how many frames should be processed with a given configuration before a new configuration is used. The parameter FIFO 335 may further store register addresses of the configuration registers 340 and data to be written to those registers 340. The parameter FIFO 335 may thus be a mechanism to store a stream of frame processing in display control unit 300 and then permit display control unit 300 to perform the stream. Various other parameters that display control unit 300 uses to control how the various sub-blocks manipulate the video frame may also be stored in registers 340. Registers 340 may include data setting input and output frame sizes, setting input and output pixel formats, location of the source frames, and destination of the output.

Parameter FIFO 335 may be configured to update control registers 340 before each source video frame is fetched. In some embodiments, parameter FIFO 335 may update all control registers 340 for each frame. In other embodiments, parameter FIFO 335 may be configured to update subsets of control registers 340 including all or none for each frame. A FIFO as used and described herein, may refer to a memory storage buffer in which data stored in the buffer is read in the same order it was written. A FIFO may be comprised of RAM or registers and may utilize pointers to the first and last entries in the FIFO.

In some embodiments, display control unit 300 may designate a quality of service (QoS) level for each pixel fetch request and/or writeback request. The QoS levels may be utilized to control the priority of requests that are sent to memory from display control unit 300. In one embodiment, there may be three QoS levels—green, yellow, and red corresponding to low, medium, and high levels of priority, respectively. The QoS information may be generated per request and/or may be communicated to the communication fabric and memory subsystem via sideband signaling. In other embodiments, other numbers of QoS levels may be utilized.

During operation, control unit 320 may be configured to monitor the state of pixel buffer 315. As described above, display control unit 300 (e.g., via pipes 305) may be configured to generate requests for data. Responsive to these requests, data is returned, processed, and used to populate pixel buffer 315. As noted, if the amount of data stored in pixel buffer 315 is inadequate to service current display needs, an underrun may occur which may cause undesirable visual artifacts or delays. One possible cause (or contributing factor) of an underrun condition may be an increased latency in servicing requests for data. For example, if display control unit 300 requests data and the return of requested data is delayed, then the amount of data in buffer 315 may not be adequate to service current processing needs. In other words, the processing rate of the data may be such that the available data is consumed and an underrun condition occurs. Consequently, ensuring the pixel buffer 315 has enough data is desired.

In various embodiments, the amount of data currently stored in pixel buffer 315 may be monitored. If the amount of data stored in pixel buffer 315 falls below a threshold, then the priority of pixel fetch requests generated by pipes 305A-B may be escalated to a higher priority or Quality of Service (QoS) level. However, if control unit 320 determines that an inter frame period or other period of relative inactivity will occur within a given period of time, then control unit 320 may prevent the priority of pixel fetch requests from being escalated to a higher priority or QoS level even if the amount of data stored in pixel buffer 315 falls below the threshold. As long as pixel buffer 315 has enough data to make it to the inter frame period, then display control unit 300 can use the inter frame period to catch up and fill pixel buffer 315 to an adequate level. As used herein, the term "inter frame period" may refer to any period of relative inactivity (e.g., a mid-frame blanking interval).

It is noted that the display control unit 300 illustrated in FIG. 3 is merely an example. In other embodiments, different functional blocks and different configurations of functional blocks may be possible depending on the specific application for which the display control unit is intended. For example, more than two video/UI pipelines may be included within a display control unit in other embodiments. Additionally, two or more units shown separately within display control unit 300 may be combined within a single functional sub-block in another embodiment.

Figure 4:
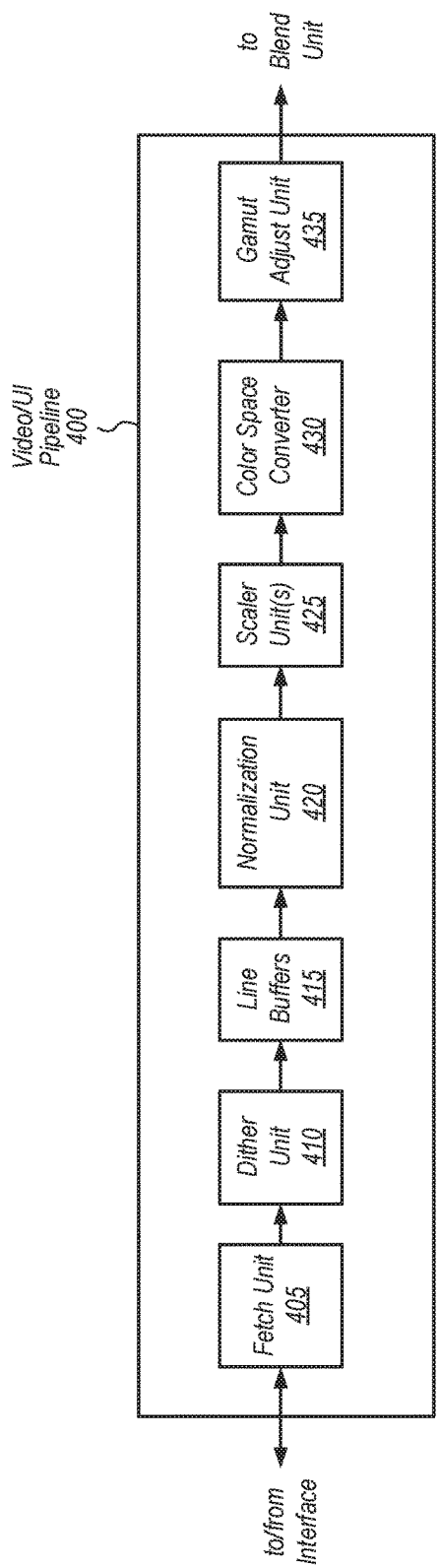
FIG. 4 is a block diagram illustrating one embodiment of a video/UI pipeline.

Turning now to FIG. 4, a block diagram of one embodiment of video/UI pipeline 400 is shown. Video/UI pipeline 400 may correspond to video/UI pipelines 301A and 301B of display control unit 300 as illustrated in FIG. 3. In the illustrated embodiment, video/UI pipeline 400 includes fetch unit 405, dither unit 410, line buffers 415, normalization unit 420, scaler unit(s) 425, color space converter 430, and gamut adjust unit 435. Video/UI pipeline 400 may be responsible for fetching pixel data for source frames stored in a memory, and then processing the fetched data before sending the processed data to a blend unit, such as, blend unit 310 of display control unit 300 as illustrated in FIG. 3.

Fetch unit 405 may be configured to generate read requests for source pixel data being processed by video/UI pipeline 400. Each read request may include one or more addresses indicating where the portion of data is stored in memory. In some embodiments, address information included in the read requests may be directed towards a virtual (also referred to herein as "logical") address space, wherein addresses do not directly point to physical locations within a memory device. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display pipeline, while in other embodiments, the memory management unit may be located elsewhere within a computing system.

Under typical operating conditions, if the amount of data in the pixel buffer (e.g., pixel buffer 315 of FIG. 3) falls below a threshold, then fetch unit 405 may be configured to escalate the priority level of read requests sent to memory. However, if a mid-frame blanking interval will start within a given period of time, then the amount of data in the pixel buffer falling below the threshold may not cause fetch unit 405 to escalate the priority level of read requests.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Dither unit 410 may, in various embodiments, provide structured noise dithering on the Luma channel of YCbCr formatted data. Other channels, such as the chroma channels of YCbCr, and other formats, such as ARGB may not be dithered.

Line buffers 415 may be configured to store the incoming frame data corresponding to row lines of a respective display screen. The frame data may be indicative of luminance and chrominance of individual pixels included within the row lines. Line buffers 415 may be designed in accordance with one of various design styles. For example, line buffers 415 may be SRAM, DRAM, or any other suitable memory type. In some embodiments, line buffers 415 may include a single input/output port, while, in other embodiments, line buffers 415 may have multiple data input/output ports. During a mid-frame blanking interval, video/UI pipeline 400 may attempt to fill line buffers 415 to capacity so that the video/UI pipeline 400 will be able to withstand any increases in latency or other disruptions once the mid-frame blanking interval ends.

Normalization unit 420 may perform an adjustment on the source pixel data. In various embodiments, normalization unit 420 may be configured to normalize the input pixel values to the range of 0.0 to 1.0. Some source images may be represented in a color space which has a range exceeding 0.0 to 1.0, or some source images may be represented in a color space with a range which uses only a portion of the values from 0.0 to 1.0. In one embodiment, normalization unit 420 may be configured to apply an offset to each input pixel value and then scale the resultant value to perform the normalization. In other embodiments, other techniques for normalizing the input pixel values may be utilized. If the input pixel values are already normalized, then normalization unit 420 may be a passthrough unit, or the input pixel values may bypass normalization unit 420.

Next, scaler unit(s) 425 may be configured to perform scaling on the source pixel data. In some embodiments, scaling of source pixels may be performed in two steps. The first step may perform a vertical scaling, and the second step may perform a horizontal scaling. Scaler unit(s) 425 may be designed according to any of varying design styles. In some embodiments, the vertical scaler and horizontal scaler of scaler unit(s) 425 may be implemented as multi-phase filters. These multi-phase filters may, in various embodiments, multiply each pixel retrieved by fetch unit 405 by a weighting factor. The resultant pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

After scaling has been performed by scaler unit(s) 425, color management within video/UI pipeline 400 may be performed by color space converter 430 and gamut adjust unit 435. In some embodiments, color space converter 430 may be configured to convert YCbCr source data to the RGB format. Alternatively, color space converter 430 may be configured to remove offsets from source data in the RGB format. Color space converter 430 may, in various embodiments, include a variety of functional blocks, such as an input offset unit, a matrix multiplier, and an output offset unit (all not shown). The use of such blocks may allow for the conversion from YCbCr format to RGB format and vice-versa.

In various embodiments, gamut adjust unit 435 may be configured to convert pixels from a non-linear color space to a linear color space, and vice-versa. In some embodiments, gamut adjust unit 435 may include a LUT and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. It is noted that the embodiment illustrated in FIG. 4 is merely an example. In other embodiments, different functional blocks and different configurations of functional blocks may be utilized.

Figure 5:
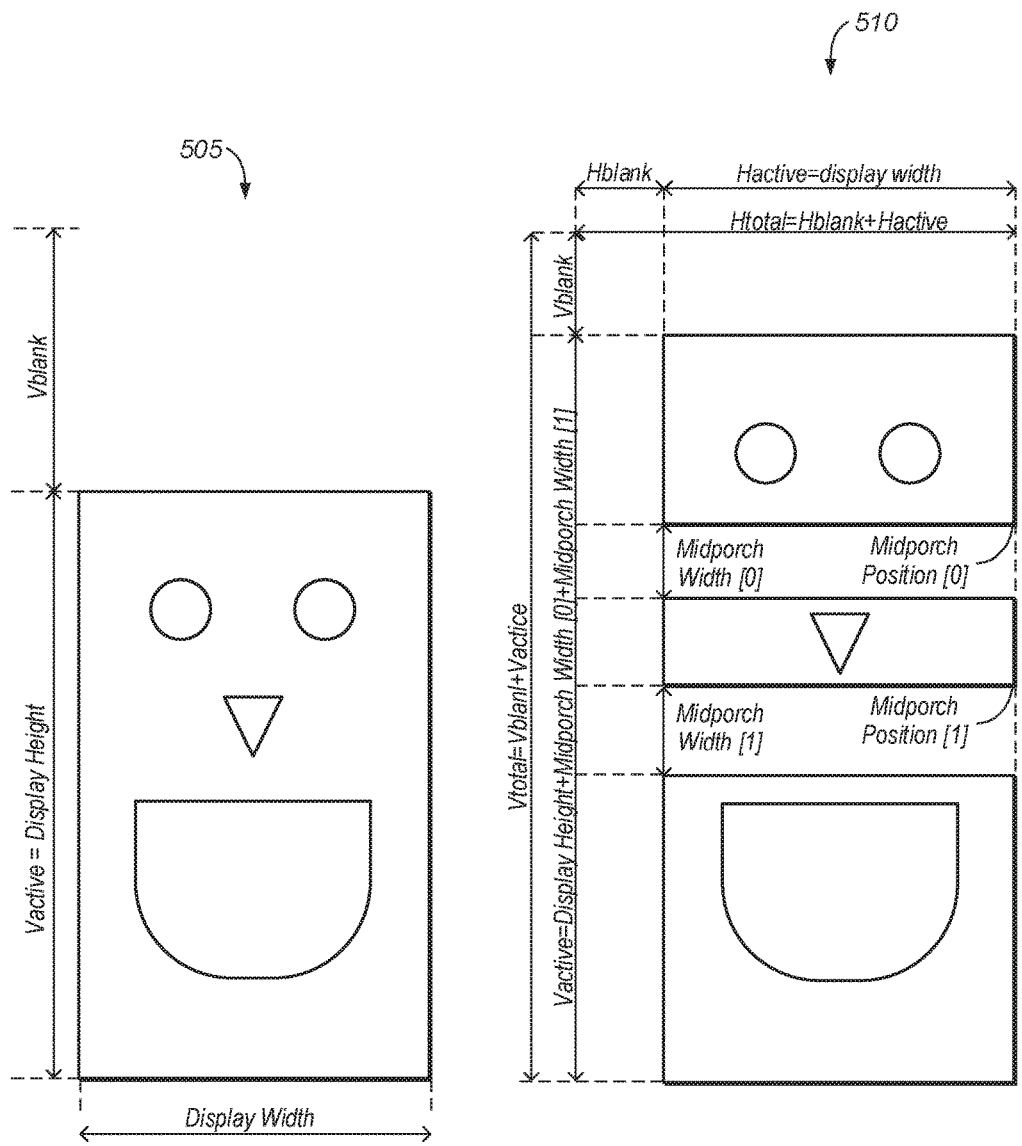
FIG. 5 illustrates one embodiment of the implementation of mid-frame blanking intervals within a given frame.

Referring now to FIG. 5, one embodiment of the implementation of mid-frame blanking intervals within a given frame 510 is shown. Frame 505 is an example of an image or video frame which may be driven to a display without the use of mid-frame blanking intervals. Frame 510 illustrates the same source image as shown in frame 505, but this time with the use of two mid-frame blanking intervals introduced within frame 510.

The mid-frame blanking intervals are inserted into the vertical active period of frame 510 at the locations denoted by midporch position [0] and midporch position [1]. It is noted that the use of two mid-frame blanking intervals within frame 510 is shown for illustrative purposes only. In other embodiments, other numbers of mid-frame blanking intervals may be utilized.

In one embodiment, the frame period used when displaying frames without mid-frame blanking intervals may be the same as the frame period used when displaying frames with mid-frame blanking intervals. For example, as shown in FIG. 5, the sum of the vertical blanking period and vertical active period for frame 505 may be equal to the sum of the vertical blanking period and vertical active period for frame 510. Therefore, since two mid-frame blanking intervals were added to the vertical active period of frame 510, the vertical blanking period of frame 510 may be decreased by the sum of the width of these two mid-frame blanking intervals. For frame 505, the sum of the single vertical blanking period and the single vertical active period is equal to Vtotal, or one frame time. Similarly, for frame 510, the sum of the vertical blanking period, the three periods of display driving of the three portions of the frame, and the width of the two mid-frame blanking intervals is also equal to Vtotal.

Generally speaking, the single vertical blanking period and single vertical active period of frame 505 are broken up into smaller pieces which are distributed throughout the entire frame time of frame 510. Accordingly, the sum of the vertical blanking period and mid-frame blanking intervals of frame 510 are equal to the single vertical blanking period of frame 505. In this manner, the overall frame rate may generally remain unchanged. In one embodiment, a vertical active signal may remain asserted during the mid-frame blanking intervals. Within the display backend, this may be accomplished by extending horizontal blanking.

In one embodiment, the mid-frame blanking intervals may be inserted into frame 510 to increase the frequency of touch sensing which can be performed on a corresponding touch sensitive display. During each mid-frame blanking interval, touch sensing may be performed on the display. Additionally, touch sensing may be performed during the vertical blanking period before the start of each frame when the display is not being actively driven.

As shown in FIG. 5, frames 505 and 510 have the same display width, which corresponds to the horizontal active (or Hactive) period shown for frame 510. Prior to the Hactive period for each line is the horizontal blanking (or Hblank) period as shown for frame 510. Similarly, prior to the vertical active (or Vactive) period for frame 510 (i.e., after the vertical active period for the previous frame) is the vertical blanking (or Vblank) period. The horizontal blanking period is the period from when the last pixel of a horizontal line is drawn on the display to when the first pixel of the next horizontal line is drawn on the display. The vertical blanking period is the period from when the last pixel of a frame is drawn on the display to when the first pixel of the next frame is drawn on the display. The vertical active period is the period from when the first pixel of a given frame is drawn on the display to when the last pixel of the given frame is drawn on the display. The vertical active period may also be referred to as the time allotted for driving the display. The vertical active period and vertical blanking period may be measured in lines, while the horizontal active period and horizontal blanking period may be measured in pixels.

When mid-frame blanking intervals are utilized for a given frame, then the vertical active period may include both the display height of the frame plus one or more midporch widths. Accordingly, the vertical active period may be equal to the display height plus the sum of midporch widths corresponding to the mid-frame blanking intervals introduced during the frame. For frame 510, the vertical active period equals the display height plus midporch width [0] plus midporch width [1].

In one embodiment, the vertical timing may be chosen such that the active and blanking periods add up to a constant period for a given refresh rate (e.g., 1/(60 hertz)). In one embodiment, the time for the mid-frame blanking intervals may be taken away from the time otherwise available for the vertical blanking period. Accordingly, the vertical blanking period may be reduced to account for the mid-frame blanking interval(s) that are introduced for each frame. It is noted that in some embodiments, the timing and duration of frame parameters may be chosen such that the vertical blanking periods and mid-frame blanking intervals are of the same duration and spaced at regular intervals in time. It is also noted that the vertical blanking period may include a vertical front porch, vertical sync pulse, and a vertical back porch. Similarly, the horizontal blanking period may include a horizontal front porch, a horizontal sync pulse, and a horizontal back porch.

Figure 6:
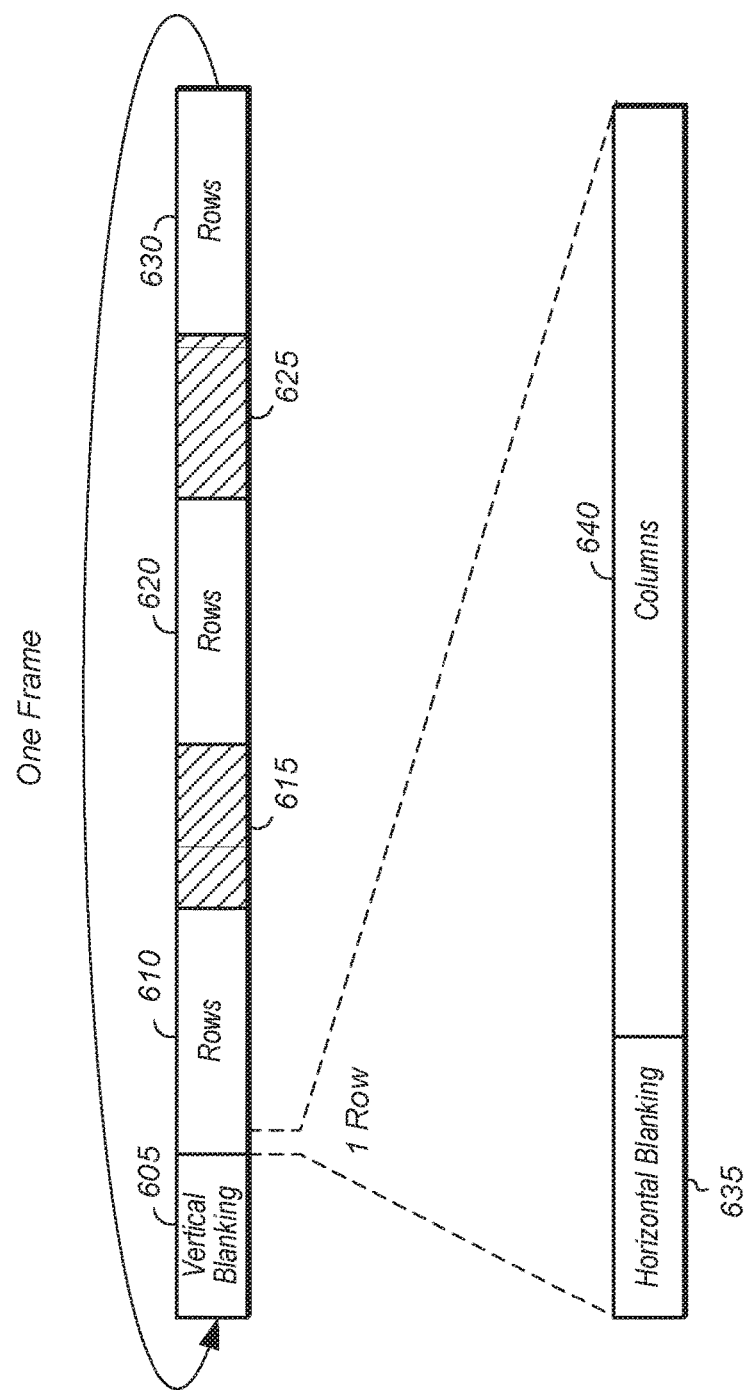
FIG. 6 illustrates one embodiment of frame components when implementing mid-frame blanking intervals.

Turning now to FIG. 6, one embodiment of frame components when implementing mid-frame blanking intervals are shown. The vertical components of a single frame are shown at the top of FIG. 6, and the components include vertical blanking period 605, rows 610 from a first portion of the frame, a first mid-frame blanking interval 615, rows 620 from a second portion of the frame, a second mid-frame blanking interval 625, rows 630 from a third portion of the frame. It is noted that while two mid-frame blanking intervals 615 and 625 are shown in FIG. 6, any number of mid-frame blanking intervals may be inserted into the display of a given frame in other embodiments.

Each frame may begin with a vertical blanking period 605 during which touch sensing may be performed on a corresponding touch-screen display. Touch sensing may also be performed during both mid-frame blanking intervals 615 and 625. If the frame rate was running at 60 hertz (Hz) in one embodiment, then by introducing the two mid-frame blanking intervals 615 and 625, touch sensing could be performed at 180 Hz, thereby increasing the frequency and improving the performance of the touch sensing.

A single row of frame rows 610 is shown expanded in the bottom of FIG. 6 to illustrate the horizontal components of the row. The expanded row begins with a horizontal blanking period 635 followed by the pixels of columns 640 being displayed. This horizontal timing may be repeated for each row of the frame until either a mid-frame blanking interval is introduced or until the bottom of the frame has been reached.

In one embodiment, vertical blanking period 605 and mid-frame blanking intervals 615 and 625 may be chosen such that they are of the same duration. Also, the locations of vertical blanking period 605 and mid-frame blanking intervals 615 and 625 may be chosen such that they are spaced at fixed, regular intervals in time so that touch sensing can be performed at a constant frequency.

Figure 7:
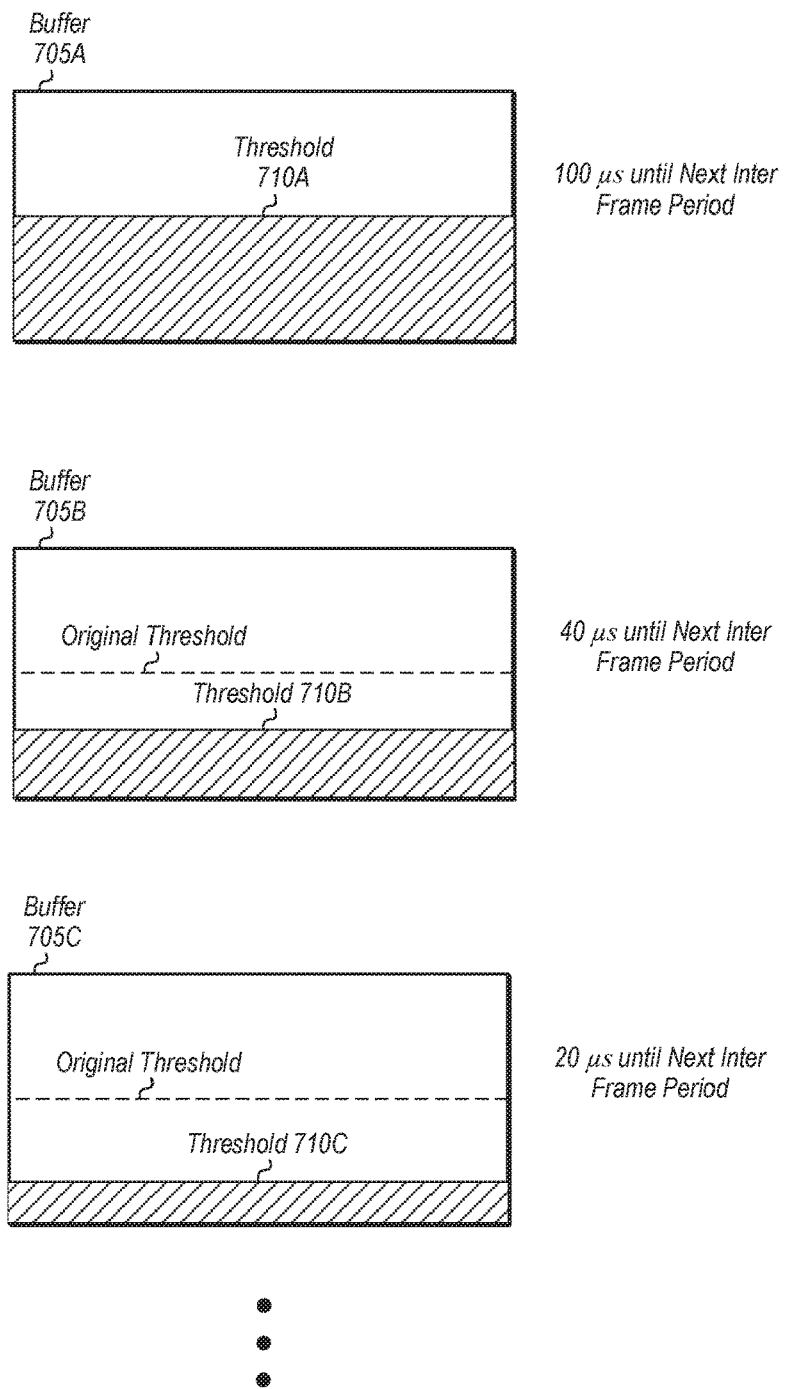
FIG. 7 illustrates one embodiment of a buffer at three different points in time.

Referring now to FIG. 7, one embodiment of a buffer at three different points in time are shown. Buffer 705A is representative of a pixel buffer and/or line buffer occupancy of a display control unit (e.g., display control unit 300 of FIG. 3) at a first point in time. As shown in FIG. 7, buffer 705A is intended to represent the buffer occupancy 100 microseconds (μs) prior to the next inter frame period (e.g., mid-frame blanking interval). Threshold 710A is intended to represent the threshold for escalating the QoS level of pixel fetch requests such that if the pixel data occupancy falls below threshold 710A, the display control unit will escalate the priority level of the pixel fetch requests to a higher level to prevent a buffer underrun from occurring.

As time elapses and the next inter frame period approaches, the threshold of the buffer 705 may be adjusted to account for the number of pixels needed to be displayed until the start of the inter frame period. Therefore, the threshold may be reduced over time as the inter frame period gets closer to beginning. In one embodiment, the threshold may be adjusted based on a calculation of how many pixels will be displayed between the current time and the time when the inter frame period starts. For example, a control unit (e.g., control unit 320) may be configured to calculate how many pixels will be displayed between the current time and the time when the inter frame period starts and then the control unit may be configured to adjust the threshold based on this calculation. This can help prevent the priority of pixel fetch requests from being escalated unnecessarily and preventing extra stress from being placed on the communication fabric and memory subsystem.

Buffer 705B is intended to represent buffer 705A at a later point in time and closer in proximity to the start of the next inter frame period. As shown in FIG. 7, buffer 705B is intended to represent a point in time 40 μs from the start of the next inter frame period. As compared to the earlier point in time represented by buffer 705A, fewer pixels are needed to be displayed to get to the next inter frame period. Accordingly, the threshold for escalating pixel fetch requests may be lowered to reflect this reduced immediate need for pixel data. Threshold 710B is shown as a lower threshold in buffer 705B, with the original threshold shown as a dashed line to indicate the reduction in the threshold for escalating the priority of pixel fetch requests.

Still further, buffer 705C is intended to represent buffer 705B at a later point in time. Buffer 705C is intended to represent the point in time which is 20 us from the next inter frame period. Threshold 710C is the new threshold which may be calculated based on the number of pixels that will be displayed before the inter frame period starts. The original threshold (corresponding to threshold 710A) is shown as a dashed line to indicate how far threshold 710C has been reduced since an earlier point in time. As the time for the next inter frame period gets closer and closer, the threshold may continue to be reduced, until the threshold is effectively zero at the start of the inter frame period. Although not shown in FIG. 7, the process of reducing the threshold may be reversed during the inter frame period as the end of the inter frame period approaches. The threshold may steadily increase over time as the end of the inter frame period nears, until eventually the threshold will return to its normal value when the inter frame period ends and pixels are once again driven to the display.

Figure 8:
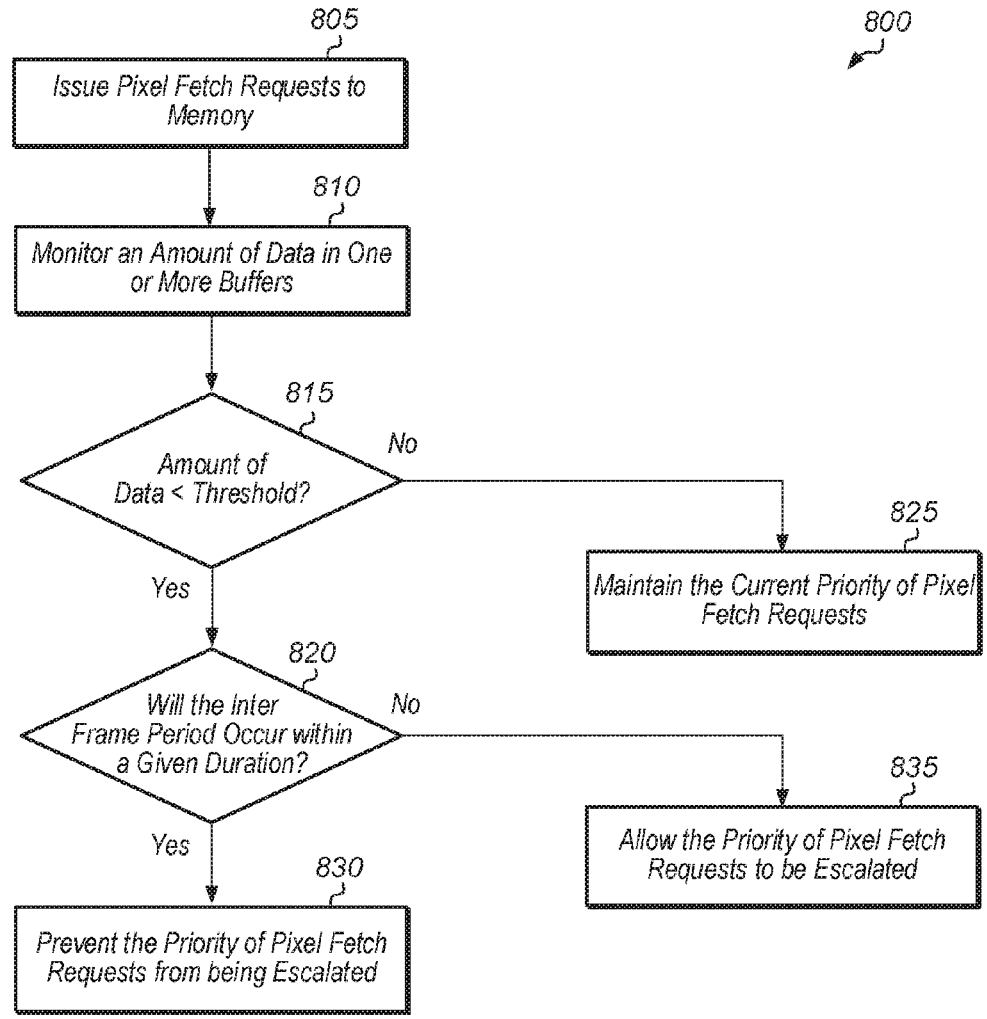
FIG. 8 is a generalized flow diagram illustrating one embodiment of a method for issuing pixel fetch requests.

Referring now to FIG. 8, one embodiment of a method 800 for issuing pixel fetch requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and display control units described herein may be configured to implement method 800.

A display control unit of a host apparatus may issue pixel fetch requests to memory (block 805). The display control unit may be coupled to the memory (via a communication fabric), and the display control unit may be coupled to a display (via a display interface). Depending on the embodiment, the host apparatus may be a mobile device (e.g., tablet, smartphone), wearable device, computer, or other computing device. Alternatively, the host apparatus may be incorporated within a computing system. While issuing pixel fetch requests, the display control unit may monitor an amount of data in one or more buffers (block 810). The one or more buffers may include a pixel buffer (i.e., output buffer) and/or one or more line buffers. If the amount of data in the buffer(s) is less than a threshold (conditional block 815, "yes" leg), then the display control unit may determine if an inter frame period will occur within a given period of time (conditional block 820). In one embodiment, the inter frame period may be a mid-frame blanking interval. In one embodiment, the given period of time may be calculated based on a number of lines of pixels which will be driven to the display until the inter frame period starts. For example, the display control unit may track the line numbers generated by a timing generator to determine how soon the inter frame period will begin. If the amount of data in the buffer(s) is above the threshold (conditional block 815, "no" leg), then the display control unit may maintain the current priority of pixel fetch requests (block 825).

If an inter frame period will occur within a given period of time (conditional block 820, "yes" leg), then the display control unit may prevent the priority of pixel fetch requests from being escalated (block 830). If an inter frame period will not occur within a given period of time (conditional block 820, "no" leg), then the display control unit may allow the priority of pixel fetch requests to be escalated (block 835). After blocks 825, 830, and 835, method 800 may end.

Figure 9:
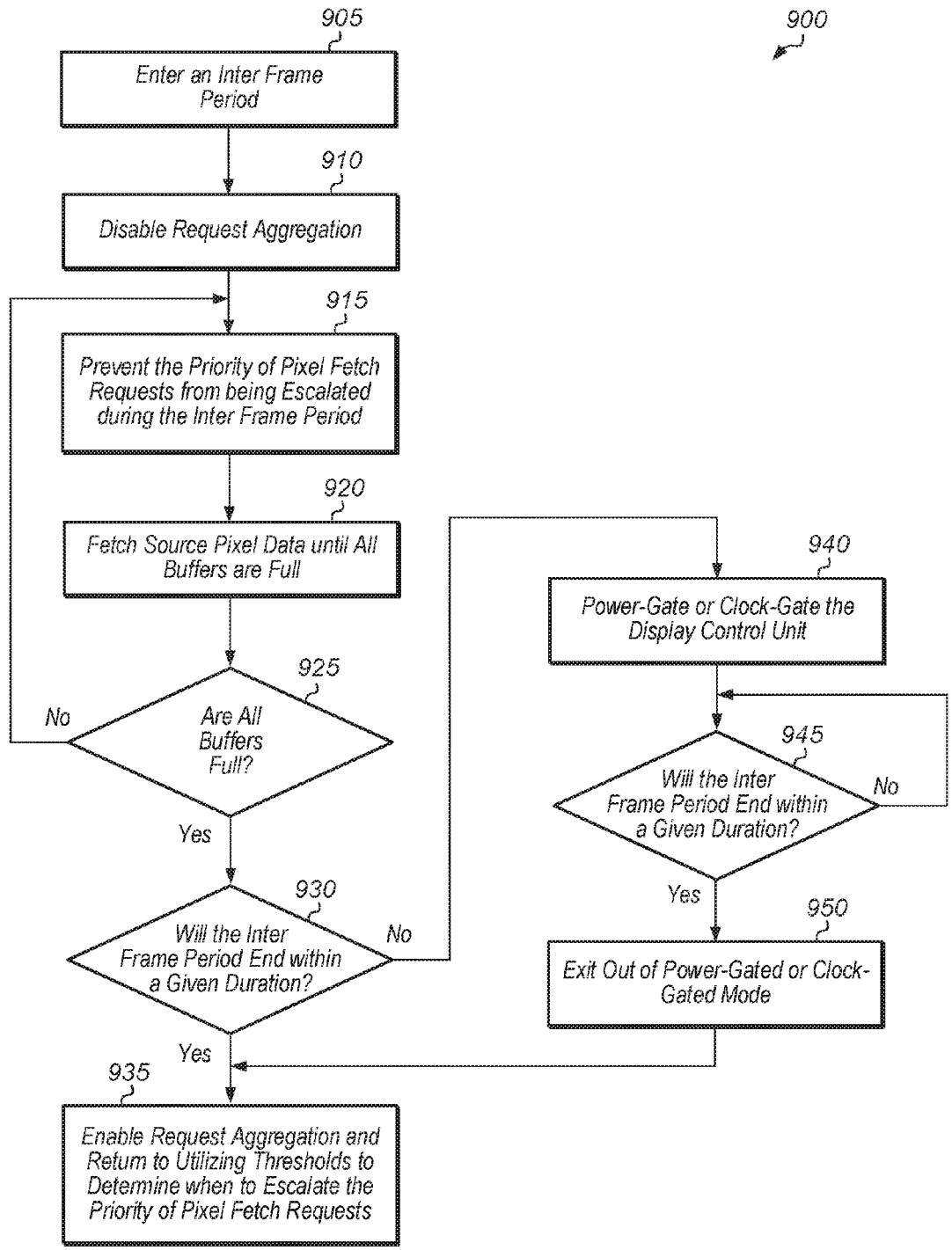
FIG. 9 is a generalized flow diagram illustrating one embodiment of a method for operating a display control unit during an inter frame period.

Referring now to FIG. 9, one embodiment of a method 900 for operating a display control unit during an inter frame period is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 900.

A display control unit may enter an inter frame period (block 905). In one embodiment, the inter frame period may be a mid-frame blanking interval. Next, responsive to entering the inter frame period, the display control unit may disable request aggregation (block 910). The display control unit may also prevent the priority of pixel fetch requests from being escalated during the inter frame period (block 915). In other words, the display control unit may de-prioritize pixel fetch requests in block 915. The display control unit may also fetch source pixel data until all buffers (e.g., line buffers, pixel buffer) are full (block 920). The display control unit may also fetch as much frame configuration data as is ready for subsequent frames in block 920. In order to fetch as much frame configuration data as possible in block 920, the display control unit may remove restrictions on the fetching of frame configuration data which would normally be enforced. These restrictions may be utilized to prevent the fetching of frame configuration data for subsequent frames from interfering with the fetching of source pixel data for the current frame.

Next, the display control unit may determine if all buffers are full (conditional block 925). Alternatively, the display control unit may determine if the buffers have reached a certain occupancy level (e.g., 70%, 80%) which is deemed sufficient for ensuring a display underrun condition will not occur or is unlikely to occur. If all buffers in the display control unit are full (conditional block 925, "yes" leg), then the display control unit may determine if the end of the inter frame period will occur within a given period of time (conditional block 930). In one embodiment, the display control unit may determine when the inter frame period will end based on line numbers generated by a timing generator. In another embodiment, the display control unit may utilize a timer to track the duration of the inter frame period and determine when the inter frame period will end. If all of the buffers in the display control unit are not full (conditional block 925, "no" leg), then method 900 may return to block 915. If the inter frame period will end within a given period of time (conditional block 930, "yes" leg), then the display control unit may enable request aggregation and return to utilizing thresholds to determine when to escalate the priority of pixel fetch requests (block 935). After block 935, method 900 may end. If the inter frame period will not end within a given period of time (conditional block 930, "no" leg), then the display control unit may be power-gated or clock-gated (block 940). In other embodiments, the display control unit may place one or more components into a reduced power state in block 940 using power-gating, clock-gating, or other power reduction techniques. Additionally, one or more other components of the host apparatus may also be power-gated, clock-gated, or placed into a reduced power state for the remainder of the inter frame period.

After block 940, if the end of the inter frame period will occur within a given period of time (conditional block 945, "yes" leg), then the display control unit may exit out of power-gated or clock-gated mode (block 950). After block 950, method 900 may jump to block 935. If the end of the inter frame period will not occur within a given period of time (conditional block 945, "no" leg), then method 900 may remain at conditional block 945.

Figure 10:
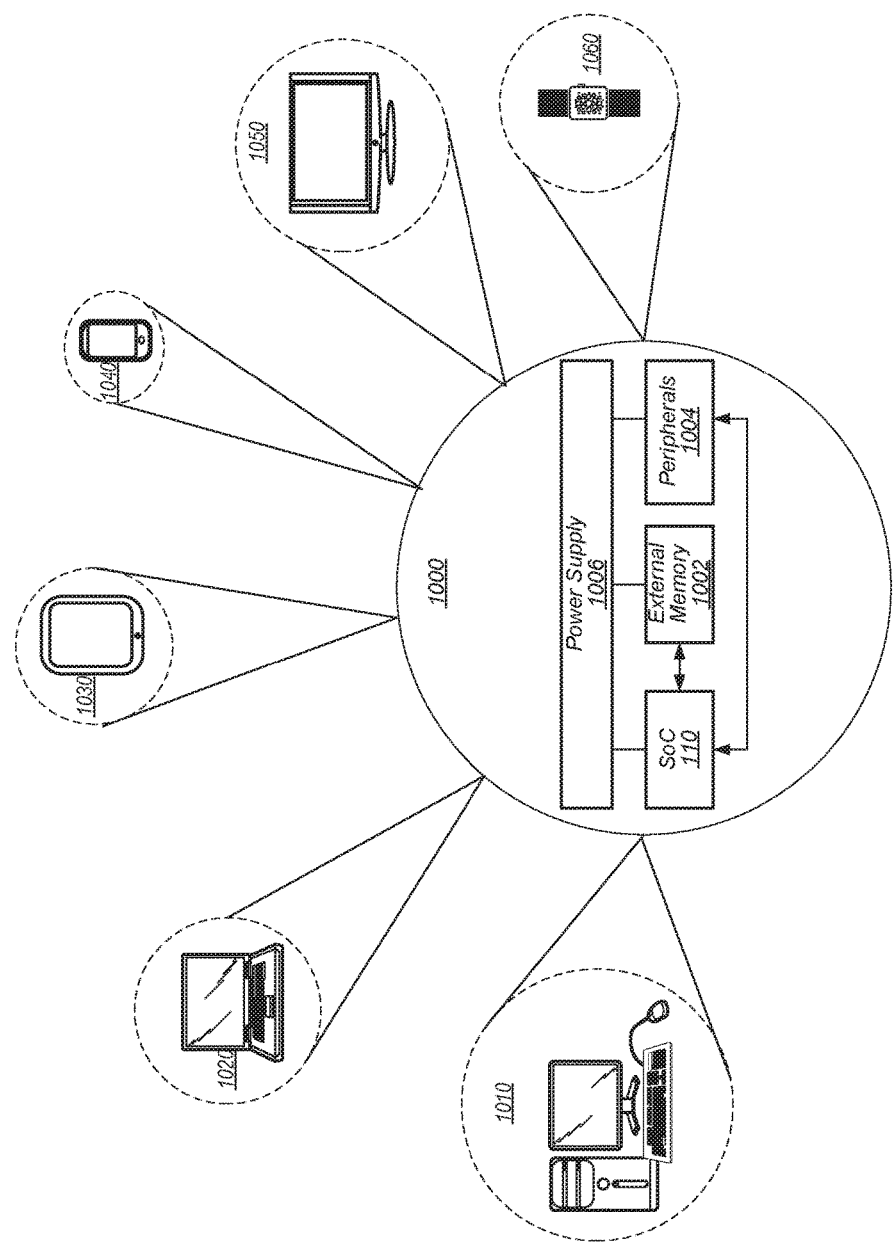
FIG. 10 is a block diagram of one embodiment of a system.

Referring next to FIG. 10, a block diagram of one embodiment of a system 1000 is shown. As shown, system 1000 may represent chip, circuitry, components, etc., of a desktop computer 1010, laptop computer 1020, tablet computer 1030, cell phone 1040, television 1050 (or set top box configured to be coupled to a television), wrist watch or other wearable item 1060, or otherwise. Other devices are possible and are contemplated. In the illustrated embodiment, the system 1000 includes at least one instance of SoC 110 (of FIG. 1) coupled to an external memory 1002.

SoC 110 may be coupled to one or more peripherals 1004 and the external memory 1002. A power supply 1006 is also provided which supplies the supply voltages to SoC 110 as well as one or more supply voltages to the memory 1002 and/or the peripherals 1004. In various embodiments, power supply 1006 may represent a battery (e.g., a rechargeable battery in a smart phone, laptop or tablet computer). In some embodiments, more than one instance of SoC 110 may be included (and more than one external memory 1002 may be included as well).

The memory 1002 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1004 may include any desired circuitry, depending on the type of system 1000. For example, in one embodiment, peripherals 1004 may include devices for various types of wireless communication, such as wifi, Bluetooth, cellular, global positioning system, etc. The peripherals 1004 may also include additional storage, including RAM storage, solid state storage, or disk storage. The peripherals 1004 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A display control unit comprising:
a processing pipeline configured to generate requests for data;
a timer to track a duration of inter frame periods;
a buffer configured to store data; and
a control unit;
wherein in response to detecting initiation of an inter frame period, the control unit is configured to:
disable aggregation of requests;
fetch source pixel data until the buffer is full; and
enable aggregation of requests, in response to determining the buffer is full and determining the inter frame period will end within a given period of time.

2. The display control unit as recited in claim 1, wherein in response to determining the buffer has less than a threshold amount of data, the display control unit is further configured to:
utilize a first priority level for generated requests, responsive to determining that an inter frame period will not occur within a given period of time; and
utilize a second priority level for generated requests, responsive to determining that an inter frame period will occur within a given period of time, wherein the first priority level is higher than the second priority level.

3. The display control unit as recited in claim 1, wherein the display control unit is configured to:
enable request aggregation responsive to exiting the inter frame period.

4. The display control unit as recited in claim 1, wherein the given period of time is calculated based on a number of lines of pixels which will be driven to a display before the inter frame period starts.

5. The display control unit as recited in claim 1, wherein the inter frame period is a mid-frame blanking interval, and wherein the display control unit is further configured to remove restrictions on fetching of frame configuration data responsive to entering an inter frame period.

6. The display control unit as recited in claim 1, wherein the display control unit is further configured to escalate a priority of requests to a higher priority level responsive to determining the buffer has less than a threshold amount of data and responsive to determining an end of the inter frame period will occur within a given period of time.

7. A computing system comprising:
a display; and
a timer to track a duration of inter frame periods;
a display control unit configured to:
monitor an amount of data stored in a buffer; and
in response to detecting initiation of an inter frame period:
disable aggregation of requests; and
fetch source pixel data until the buffer is full;
in response to determining the buffer is full, enter at least one of a Dower-gated mode or a clock-gated mode, responsive to determining the end of the inter frame period will not occur within a given period of time.

8. The computing system as recited in claim 7, wherein in response to determining the buffer has less than a threshold amount of data, the display control unit is further configured to:
utilize a first priority level for requests generated responsive to determining that an inter frame period will not occur within a given period of time; and
utilize a second priority level for requests generated responsive to determining that an inter frame period will occur within a given period of time, wherein the first priority level is higher than the second priority level.

9. The computing system as recited in claim 7, wherein the display control unit is configured to:
enable request aggregation responsive to exiting the inter frame period.

10. The computing system as recited in claim 7, wherein the given period of time is calculated based on a number of lines of pixels which will be driven to a display before the inter frame period starts.

11. The computing system as recited in claim 7, wherein the inter frame period is a mid-frame blanking interval, and wherein the display control unit is further configured to remove restrictions on fetching of frame configuration data responsive to entering an inter frame period.

12. The computing system as recited in claim 7, wherein the display control unit is further configured to escalate a priority of requests to a higher priority level responsive to determining the buffer has less than a threshold amount of data and responsive to determining an end of the inter frame period will occur within a given period of time.

13. A method comprising:
monitoring an amount of data stored in a buffer; and
in response to detecting initiation of an inter frame period:
disabling aggregation of requests; and
fetching source pixel data until the buffer is full;
maintaining a timer to track a duration of inter frame periods;
in response to determining the buffer is full, enabling aggregation of requests in response to determining the inter frame period will end within a first period of time.

14. The method as recited in claim 13, wherein in response to determining the buffer has less than a threshold amount of data, the method further comprises:
utilizing a first priority level for requests generated responsive to determining that an inter frame period will not occur within a given period of time; and
utilizing a second priority level for requests generated responsive to determining that an inter frame period will occur within a given period of time, wherein the first priority level is higher than the second priority level.

15. The method as recited in claim 13, wherein the given period of time is calculated based on a number of lines of pixels which will be driven to a display before the inter frame period starts.

16. The method as recited in claim 13, wherein the inter frame period is a mid-frame blanking interval, wherein the method further comprises removing restrictions on fetching of frame configuration data responsive to entering an inter frame period.

17. The method as recited in claim 13, further comprising escalating a priority of requests responsive to determining the buffer has less than a threshold amount of data and responsive to determining an end of the inter frame period will occur within a second period of time.

* * * * *